(12) United States Patent
Perkins et al.

(10) Patent No.: US 10,117,489 B2
(45) Date of Patent: Nov. 6, 2018

(54) KIT FOR ILLUMINATING THE HAIR OF A USER AND ASSOCIATED METHOD

(71) Applicant: L'OREAL, Paris (FR)

(72) Inventors: Steven Perkins, Aulnay Sous Bois (FR); Xavier Schultze, Les Pavillons Sous Bois (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 15/527,468

(22) PCT Filed: Nov. 16, 2015

(86) PCT No.: PCT/EP2015/076649
§ 371 (c)(1),
(2) Date: May 17, 2017

(87) PCT Pub. No.: WO2016/079038
PCT Pub. Date: May 26, 2016

(65) Prior Publication Data
US 2017/0354224 A1    Dec. 14, 2017

(30) Foreign Application Priority Data

Nov. 18, 2014   (EP) ..................... 14306831

(51) Int. Cl.
*F21V 8/00* (2006.01)
*A45D 8/24* (2006.01)
*A45D 8/00* (2006.01)
*A45D 8/20* (2006.01)
*F21K 9/61* (2016.01)
(Continued)

(52) U.S. Cl.
CPC ................. *A45D 8/24* (2013.01); *A45D 8/00* (2013.01); *A45D 8/20* (2013.01); *A45D 8/34* (2013.01); *A45D 8/36* (2013.01); *F21K 9/61* (2016.08); *F21K 9/64* (2016.08); *F21V 33/0008* (2013.01); *G02B 6/001* (2013.01); *G02B 6/0003* (2013.01);
(Continued)

(58) Field of Classification Search
CPC .... A45D 8/24; A45D 8/34; A45D 8/36; F21K 9/61; F21K 9/64; F21V 33/0008; G02B 6/0003; G02B 6/001
See application file for complete search history.

(56) References Cited

U.S. PATENT DOCUMENTS

| 2009/0059359 A1* | 3/2009 | Nahm | A61B 1/00165 359/368 |
| 2009/0135877 A1* | 5/2009 | Yang | H01S 5/10 372/50.11 |
| 2014/0198520 A1* | 7/2014 | Bennett | G02B 6/001 362/556 |

FOREIGN PATENT DOCUMENTS

| JP | 2005319244 A | * 11/2005 |
| JP | 2005319244 A | 11/2005 |

(Continued)

*Primary Examiner* — Mary Ellen Bowman
(74) *Attorney, Agent, or Firm* — Polsinelli PC

(57) ABSTRACT

A kit for illuminating the hair of a user, comprises:
at least one light emitting diode emitting light at a wavelength,
an optical fiber (26) coupled to the or each light emitting diode,
a fastening element (22) to fasten the or each light emitting diode and/or the optical fiber to the hair of a user,
The kit comprises a fluorescent material (30), the optical fiber (26) being configured to transmit the light emitted by the or each light emitting diode to the fluorescent material (30), the fluorescent material (30) being excited at the wavelength of the or each light emitting diode.

20 Claims, 1 Drawing Sheet

Figures 1, 2:
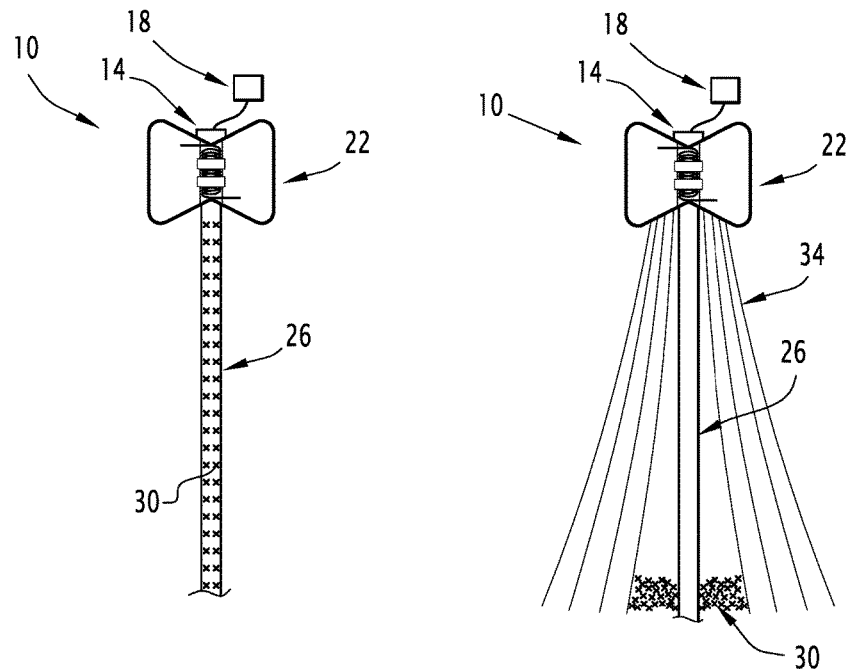

(51) Int. Cl.
    *F21K 9/64* (2016.01)
    *A45D 8/34* (2006.01)
    *A45D 8/36* (2006.01)
    *F21V 33/00* (2006.01)
    *F21Y 115/10* (2016.01)
    *F21W 121/06* (2006.01)

(52) U.S. Cl.
    CPC ... *A45D 2008/004* (2013.01); *F21W 2121/06* (2013.01); *F21Y 2115/10* (2016.08)

(56) References Cited

FOREIGN PATENT DOCUMENTS

JP    2006-296512 A    11/2006
WO    WO-2006/092598 A2    9/2006

\* cited by examiner

U.S. Patent  Nov. 6, 2018  US 10,117,489 B2

KIT FOR ILLUMINATING THE HAIR OF A USER AND ASSOCIATED METHOD

CROSS REFERENCE TO RELATED APPLICATIONS

This application is a National Phase filing under 35 U.S.C. § 371 of PCT/EP2015/076649 filed on Nov. 16, 2015; and this application claims priority to Application No. 14306831.0 filed in Europe on Nov. 18, 2014 under 35 U.S.C. § 119. The entire contents of each application are hereby incorporated by reference.

This invention relates to a kit for illuminating the hair of a user, comprising:
- at least one light emitting diode emitting light at a wavelength,
- an optical fiber coupled to the or each light emitting diode, and
- a fastening element to fasten the or each light emitting diode and/or the optical fiber to the hair of a user.

The kit is intended to be fastened to the hair of a user in order to illuminate the hair of the user.

A device for hair illumination, comprising light emitting diodes secured to the hair of a user with some clips, is known from the prior art. In the known device, a bundle of around one hundred plastic optical fibers of varying lengths is formed, with each optical fiber coupled to a light emitting diode. Hence, the light emitted by each light emitting diode exits at the end of each optical fiber, providing spots of light at different lengths on the hair of the user.

However, the coupling of the light emitting diodes to the optical fibers, results in that a large amount of light is lost. Consequently, the power consumption of the light emitting diodes and the number of light emitting diodes required is high. In addition, since each optical fiber is only illuminated at its tip, a huge number of optical fibers with various lengths is required to provide light along the entire length of the hair. Hence, the hair illumination device appears to be inconvenient, relatively heavy and voluminous.

Furthermore, such a device does not allow producing diffusive light emanating from a large area of the hair surface. Therefore, the hair illumination obtained with such an illumination device is limited.

An object of the invention is to obtain a kit for illuminating the hair of a user, more convenient to use and which provides a enhanced illumination effect when illuminating the hair of a user, and offers in particular a wide range of colors for the illumination.

To this end, the invention relates to a kit for illuminating the hair of a user of the type mentioned above, wherein the kit comprises a fluorescent material, the optical fiber being configured to transmit the light emitted by the or each light emitting diode to the fluorescent material, the fluorescent material being excited at the wavelength of the or each light emitting diode.

The kit according to the invention may include one or more of the following features, considered alone or in any combination that is technically possible:
- the fluorescent material is arranged inside the optical fiber;
- the fluorescent material is placed in a cosmetic composition intended to be applied on hair;
- a sample of external hair is permanently secured to the fastening element, the fluorescent material being located on the sample of external hair;
- the optical fiber is a lossy fiber emitting light coming from the or each light emitting diode at least along a longitudinal segment of the optical fiber and preferably along the entire length of the optical fiber;
- the or each light emitting diode is a microled;
- the or each light emitting diode has a diameter inferior to 30 μm, preferably inferior to 20 μm and advantageously equal to 15 μm;
- the maximum operating power of the or each light emitting diode is lower than 5 mW;
- the wavelength of the light emitted by the or each light emitting diode is comprised in a range between 315 nm and 420 nm and advantageously in a range between 400 nm and 410 nm;
- the fluorescent material comprises at least one fluorophore able to be excited at the wavelength of the or each light emitting diode, the light emitted by each excited fluorophore having a wavelength in the visible range;
- the fluorescent material comprises at least a first fluorophore and a second fluorophore emitting light at different wavelengths; and
- a power supply device for supplying the or each light emitting diode, the power supply device comprising a film battery or an inductive power source.

The invention also relates to a method for illuminating the hair of a user comprising the steps of:
- providing a kit as defined above,
- fastening the or each light emitting diode and/or the optical fiber to the hair of a user with the fastening element,
- powering the or each light emitting diode and transmitting the light emitted by the or each light emitting diode with the optical fiber, and
- exciting the fluorescent material with the light emitted by the or each light emitted diode and transmitted by the optical fiber.

The method according to the invention may include one or more of the following features considered alone or in any combination that is technically possible:
- the fluorescent material is placed in a cosmetic composition intended to be applied on hair, the method comprising a step of applying the cosmetic composition on the hair of the user, and
- the kit comprises a sample of external hair permanently attached to the fastening element, the method comprising a step of securing the sample of external hair within the hair of the user.

Figure 3:
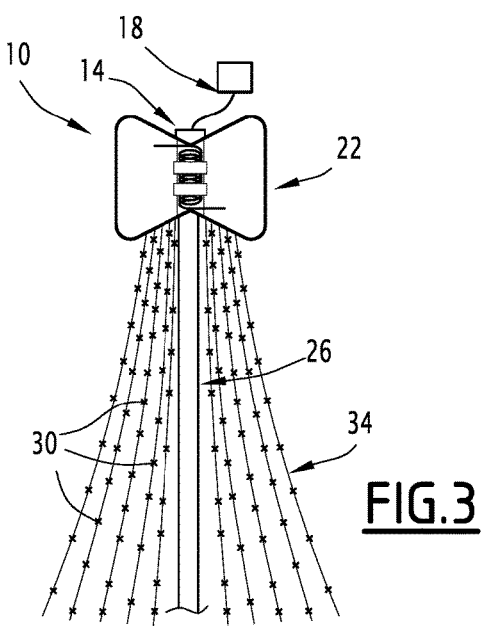

The invention will be easier to understand in view of the following description, provided solely as an example and with reference to the appended drawings in which:

FIG. 1 is a schematic representation of a kit according to a first embodiment of the invention, FIG. 2 is a schematic representation of a kit according to a second embodiment of the invention, and FIG. 3 is a schematic representation of a kit according to a third embodiment of the invention.

A kit 10 for illuminating the hair of a user, according to a first embodiment of the invention, is illustrated on FIG. 1.

The kit 10 is intended to illuminate the hair of a user with a light whose wavelength is comprised in the visible range. It is understood by "visible range" for the wavelength, the range of wavelength from 380 nanometers (nm) to 780 nm.

As illustrated on FIG. 1, the kit 10 comprises an array 14 of light emitting diodes, a power supply device 18 for powering the array 14 of light emitting diodes and a fastening element 22 for fastening the array 14 of light emitting diodes to the hair of the user. The kit 10 further comprises an optical fiber 26 for transmitting the light emitted by the array 14 of light emitting diodes and a fluorescent material 30.

The array 14 of light emitting diodes is configured to produce a light beam.

The array 14 of light emitting diodes comprises at least one light emitting diode. It is understood by "light emitting diode", an opto-electronic component capable of emitting light when it is activated by an electric current.

Advantageously, the array 14 of light emitting diodes comprises more than one light emitting diode. The number of light emitting diodes depends on the required brightness and on the power consumption of the light emitting diodes. In this embodiment, the array 14 of light emitting diodes comprises more than ten light emitting diodes, in particular eighteen light emitting diodes.

The light emitting diodes of an array 14 of light emitting diodes are preferably identical.

Each light emitting diode is capable to produce a light which is substantially monochromatic. It is understood by the term "substantially monochromatic light", a light whose wavelength range of emission is lower than 30 nm.

The wavelength $\lambda_l$ of the light produced by each light emitting diode belongs to the visible range or the near ultraviolet range (abbreviated by UVA). It is understood by "near ultraviolet range" for the wavelength, the range of wavelength from 315 nm to 380 nm. In other words, the light emitted by each light emitting diode has a wavelength $\lambda_l$ comprised between 315 nm and 780 nm. Preferably, the light emitted by each light emitting diode has a wavelength $\lambda_l$ comprised between 400 nm and 410 nm. Advantageously, the light emitted by each light emitting diode has a wavelength $\lambda_l$ equal to 405 nm.

Moreover, the light beam emitted by each light emitting diode can be collimated over a given distance, for example, over 1 millimeter (mm). It is understood by "collimated" for a light beam, a light beam whose rays are parallel or within an angle opening of less than 30° over the given distance, for example, over 1 mm.

Each light emitting diode is a microled. It is understood by "microled", a light emitting diode that has a diameter of the order of magnitude of the micrometer (µm).

The diameter of each microled is inferior to 30 µm, preferably inferior to 20 µm and advantageously equal to 15 µm.

Each microled requires very little power to operate. The maximum operating power of each microled is, indeed, inferior to 5 milliwatts (mW). Such a low power allows the use of small batteries to power the microleds.

The power supply device 18 is intended to power the array 14 of light emitting diodes.

As the array 14 of light emitting diodes requires low power, the power supply device is, preferably, a low power source, that is to say a source that delivers a power lower than 5 mW.

The power supply device 18 comprises, for example, a film battery. It is understood by "film battery", a battery whose thickness is of the order of magnitude of the millimeter. A film battery comprises, for example, a lithium ion battery.

Advantageously, the film battery can be located on or under the array 14 of light emitting diodes.

The film battery is, for example, a SoftBattery® produced by the company Enfucell.

In a variant, the power supply device 18 comprises, for example, an inductive power source for producing electric power when exposed to a variable electromagnetic field. The inductive power source is, for example, a radio-frequency induction device, that is to say a device that uses a radio frequency magnetic field to transfer energy by means of electromagnetic induction in the near field.

The fastening element 22 is intended to fasten the array 14 of light emitting diodes and/or the optical fiber 26 to the hair of the user.

The fastening element 22 can be chosen among the following group: a clip, a barrette, a strip or a hair elastic.

In a variant, the fastening element 22 may be permanently secured to a sample of external hair. The sample of external hair is a lock of hair that is not implanted in the user scalp. The hair of the lock of hair can be either false hair or real hair.

The optical fiber 26 is coupled to the array 14 of light emitting diodes. In other words, the light beam coming from the array 14 of light emitting diodes is directly injected into the optical fiber 26.

The optical fiber 26 has a length comprised between 1 centimeter (cm) and 150 cm, in particular between 1 cm and 50 cm.

The optical fiber 26 comprises a guiding core for guiding the light through the entire length of the optical fiber 26 and a cladding.

In the first embodiment of the invention, as illustrated on FIG. 1, the fluorescent material 30 is arranged inside the guiding core of the optical fiber 26 so that the optical fiber 26 is a fluorescent optical fiber. It is understood by "fluorescent optical fiber", an optical fiber comprising at least one fluorophore capable of being excited by a light in a given range of wavelength.

The fluorescent fiber is, for example, made of polystyrene surrounded by acrylic, whereas the fluorescent material 30 is located into the core of the fluorescent fiber.

The fluorescent fiber is, for example, a fiber produced by the company Optic Products, Inc. Clearlake Oaks, Calif. 95423, California, USA.

The optical fiber 26 is configured to transmit through its core the light emitted by each light emitting diode to the fluorescent material 30.

The fluorescent material 30 is configured to be excited at the wavelength $\lambda_l$ of the light emitting diodes. When the light reaches the fluorescent material 30 in the optical fiber 26, the fluorescent material 30 is capable of absorbing the light and of reemitting light at another wavelength $\lambda_f$ than the wavelength $\lambda_l$ of the light emitted by the light emitting diodes.

The fluorescent material 30 advantageously comprises at least one fluorophore. It is understood by "fluorophore", a fluorescent chemical compound that can re-emit light upon light excitation.

Preferably, the fluorescent material 30 comprises a plurality of fluorophores.

Each fluorophore is capable of being excited at the wavelength $\lambda_l$ emitted by the array 14 of light emitting diodes. The light emitted by each fluorophore has a wavelength $\lambda_f$ in the visible range.

The method for illuminating the hair of a user according to the first embodiment of the invention will now be described.

Initially, the hair illumination method comprises a step of providing a kit 10 as described above. The array 14 of light emitting diodes is unpowered and the optical fiber 26 is not illuminated.

Then, the hair illumination method comprises a step of fastening the array 14 of light emitting diodes and/or the optical fiber 26 to the hair of the user with the fastening element 22.

The hair illumination method further comprises a step of powering the array 14 of light emitting diodes with the power supply device 18, so that the array 14 emits a light at a wavelength $\lambda_I$.

The optical fiber 26 being a fluorescent fiber, the hair illumination method comprises a step of transmitting the light emitted by the array 14 of light emitting diodes through the optical fiber 26, up to the end of the optical fiber 26. During this step, the fluorophores of the fluorescent material 30 present in the core of the optical fiber 26 are excited by the light emitted by the array 14 of light emitting diodes at the wavelength $\lambda_I$. Then, each excited fluorophore emits a light at a wavelength $\lambda_f$ in the visible range.

Like this, as illustrated on FIG. 1, the entire optical fiber 26 is illuminated with a light having a wavelength $\lambda_f$ in the visible range.

According to a second embodiment of the invention illustrated on FIG. 2, the elements identical to the kit 10 of the first embodiment of the invention are not described again. Only the differences are highlighted.

In this second embodiment of the invention, a sample of external hair 34 is permanently secured to the fastening element 22. The sample of external hair 34 is a lock of hair that is not implanted in the user scalp. The hair of the lock of hair can be either false hair or real hair.

The optical fiber 26 is not a fluorescent fiber. The optical fiber 26 is a standard fiber capable to transmit the light coming from the array 14 of light emitting diodes to the opposite end of the optical fiber 26. The optical fiber 26 is intended to transmit the light emitted by the array 14 of light emitting diodes along the entire length of the optical fiber 26.

The fluorescent material 30 is comprised in a cosmetic composition intended to be applied directly on the hair of the user or on the sample of external hair 34 secured to the fastening element 22.

The fluorophores of the fluorescent material 30 are either identical or different. When the fluorophores of the fluorescent material 30 are identical, the excited fluorophores emit a light at a single wavelength A. When some fluorophores of the fluorescent material 30 are different, at least a first fluorophore and a second fluorophore emit a light at different wavelengths $\lambda_f$.

Each fluorophore belongs, for example, to a family chosen in a group comprising: the naphtalimides, the coumarines, the xanthenodiquinolizines, the azaxanthenes, the naphtolactames, the azlactones, the oxazines, the thiazines, the dioxazines, the pyrenes and the nitrobenzoxadiazoles.

The fluorescent material 30 is applied on the sample of external hair 34 located at the exit of the optical fiber 26.

The method for illuminating the hair of a user according to the second embodiment of the invention differs from the first embodiment in the fact that it comprises a step of securing the sample of external hair 34 on the hair of the user.

Moreover, the method also comprises a step of transmitting, through the optical fiber 26, the light coming from the array 14 of light emitting diodes until the opposite end of the optical fiber 26. During this step, the fluorophores of the fluorescent material 30 applied on the sample of hair of the user are excited by the light emitted by the optical fiber 26. As illustrated on FIG. 2, the excited fluorophores are located in the vicinity of the exit of the optical fiber 26. Then, each excited fluorophore emits a light at a wavelength $\lambda_f$ in the visible.

The light emitted by the fluorophores has one or more wavelength $\lambda_f$ in the visible range, depending on the type of the fluorophores. Indeed, two different fluorophores may emit light at different wavelengths $\lambda_f$ in the visible. It is understood by "type of a fluorophore", the category to which the fluorophore belong, the fluorophores of a same category being capable of emitting a light at a given wavelength when being excited.

As a consequence, a part of the sample of external hair 34 is illuminated in a located area of the hair of the user.

According to a third embodiment of the invention, the elements identical to the kit 10 of the second embodiment of the invention are not described again. Only the differences are highlighted.

In the third embodiment, no sample of external hair is secured to the fastening element 22. The fluorescent material 30 is directly applied on the hair of the user located at the exit of the optical fiber 26.

The method for illuminating the hair of a user according to the third embodiment is identical to the method of the second embodiment.

As a consequence, a part of the hair of the user is illuminated in a located area of the hair of the user.

According to a fourth embodiment of the invention illustrated on FIG. 3, the elements identical to the kit 10 of the second embodiment of the invention are not described again. Only the differences are highlighted.

In this fourth embodiment of the invention, the optical fiber 26 is not a standard fiber. The optical fiber 26 is a lossy fiber. It is understood by "lossy fiber", an optical fiber capable of emitting a light along a longitudinal segment of the optical fiber, the light emitted being at the same wavelength $\lambda_I$ than the light entering into the optical fiber. Preferably, the lossy fiber is capable of emitting light along the entire length of the lossy fiber.

The fluorescent material 30 is applied on the whole surface of the sample of external hair 34 and not only on the surface of the sample of external hair located at the exit of the optical fiber 26.

The method for illuminating the hair of a user according to the second embodiment of the invention differs from the second embodiment by the fact that it comprises a step of emitting, along a longitudinal segment of the optical fiber 26, a light at the same wavelength $\lambda_I$ than the light emitted by the array 14 of light emitting diodes. The light is advantageously emitted along the entire length of the optical fiber 26.

During this step, the fluorophores of the fluorescent material 30 applied on the sample of external hair 34 are excited by the light emitted by the optical fiber 26. The excited fluorophores are the fluorophores located in the vicinity of the longitudinal segment of the optical fiber 26 and/or in the vicinity of the optical fiber 26. Then, each excited fluorophore emits a light at a wavelength $\lambda_f$ in the visible.

Consequently, the sample of external hair 34 is illuminated on the whole length of the longitudinal segment of the optical fiber 26 or on the whole length of the optical fiber 26. As illustrated on FIG. 3, it is therefore possible to illuminate a lock of hair on all its length.

According to a fifth embodiment of the invention, the elements identical to the kit 10 of the fourth embodiment of the invention are not described again. Only the differences are highlighted.

In the fifth embodiment, no sample of external hair is secured to the fastening element 22. The fluorescent material 30 is directly applied on the entire length of the hair of the user located on both sides of the optical fiber 26 or on an entire area of the hair of the user.

The method for illuminating the hair of a user comprises an initial step of applying the cosmetic composition containing the fluorescent material 30 on the hair of the user.

The method for illuminating the hair of a user according to the fifth embodiment is identical to the method of the fourth embodiment.

Consequently, the hair of the user is illuminated on the whole length of the longitudinal segment of the optical fiber 26 or on the whole length of the optical fiber 26.

Hence, the kit 10 is configured to illuminate the hair of a user with a wide range of colors. Indeed, the range of colors available only depends on the type of the fluorophores of the fluorescent material 30. It is, therefore, possible to illuminate the hair of the user with a plurality of colors at the same time, depending only on the type of the fluorophores of the fluorescent material 30. Moreover, it is not necessary to use light emitting diodes emitting light at different wavelengths $\lambda_i$ because the color of illumination only depends on the type of fluorophores. Light emitting diodes emitting light at a wavelength $\lambda_i$ of about 405 nm are capable of exciting a large range of different fluorophores emitting at different wavelengths $\lambda_f$ with a light at a single wavelength.

Therefore, the kit 10 allows any colors to be produced in a simple way with a single kit 10 and without needing to embed light emitting diodes along the surface of the hair to be illuminated.

The kit 10 also allows to produce light on a large area of the hair of the user using a single optical fiber 26, whereas the device of the state of the art only produce light at the ends of a plurality of optical fibers 26. Moreover, the kit 10 allows a diffuse colored effect to be obtained on the hair of the user.

The use of microleds allows reducing both the weight of the kit 10 and the power consumption. Thus, small power supply device 18 can be chosen to power the microleds. Hence, the kit 10 appears to be more convenient and less voluminous than the device of the state of the art.

Therefore, compared to the device of the state of the art, the kit 10 for illuminating the hair of a user is more convenient to use and provides a more natural effect when illuminating the hair of a user.

The invention claimed is:

1. A kit for illuminating the hair of a user, comprising:
   at least one light emitting diode emitting light at a wavelength ($\lambda_i$),
   an optical fiber coupled to the or each light emitting diode,
   a fastening element to fasten the or each light emitting diode and/or the optical fiber to the hair of a user,
   characterized in that the kit comprises a fluorescent material, the optical fiber being configured to transmit the light emitted by the or each light emitting diode to the fluorescent material, the fluorescent material being excited at the wavelength ($\lambda_i$) of the or each light emitting diode, and wherein the fluorescent material is arranged inside the optical fiber and/or is placed in a cosmetic composition intended to be applied on hair.

2. The kit according to claim 1, wherein the fluorescent material is arranged inside the optical fiber.

3. The kit according to claim 1, wherein the fluorescent material is placed in a cosmetic composition intended to be applied on hair.

4. The kit according to claim 1, wherein a sample of external hair is permanently secured to the fastening element, the fluorescent material being located on the sample of external hair.

5. The kit according to claim 3, wherein the optical fiber is a lossy fiber emitting light coming from the or each light emitting diode at least along a longitudinal segment of the optical fiber.

6. The kit according to claim 1, wherein the or each light emitting diode is a microled.

7. The kit according to claim 1, wherein the or each light emitting diode has a diameter inferior to 30 μm.

8. The kit according to claim 1, wherein the maximum operating power of the or each light emitting diode is lower than 5 mW.

9. The kit according to claim 1, wherein the wavelength ($\lambda_i$) of the light emitted by the or each light emitting diode is in a range between 315 nm and 420 nm.

10. The kit according to claim 1, wherein the fluorescent material comprises at least one fluorophore able to be excited at the wavelength ($\lambda_i$) of the or each light emitting diode, the light emitted by each excited fluorophore having a wavelength ($\lambda_f$) in the visible range.

11. The kit according to claim 10, wherein the fluorescent material comprises at least a first fluorophore and a second fluorophore emitting light at different wavelengths ($\lambda_f$).

12. The kit according to claim 1, comprising a power supply device for supplying the or each light emitting diode, the power supply device comprising a film battery or an inductive power source.

13. A method for illuminating the hair of a user comprising the steps of:
   providing a kit according to claim 1,
   fastening the or each light emitting diode and/or the optical fiber to the hair of a user with the fastening element,
   powering the or each light emitting diode and transmitting the light emitted by the or each light emitting diode with the optical fiber, and
   exciting the fluorescent material with the light emitted by the or each light emitted diode and transmitted by the optical fiber.

14. The method according to claim 13, wherein the fluorescent material is placed in a cosmetic composition intended to be applied on hair, the method comprising a step of applying the cosmetic composition on the hair of the user.

15. The method according to claim 13, wherein the kit comprises a sample of external hair permanently attached to the fastening element, the method comprising a step of securing the sample of external hair within the hair of the user.

16. The kit according to claim 2, wherein the fluorescent material is placed in a cosmetic composition intended to be applied on hair.

17. The kit according to claim 2, wherein a sample of external hair is permanently secured to the fastening element, the fluorescent material being located on the sample of external hair.

18. The kit according to claim 3, wherein a sample of external hair is permanently secured to the fastening element, the fluorescent material being located on the sample of external hair.

19. The kit according to claim 4, wherein the optical fiber is a lossy fiber emitting light coming from the or each light emitting diode at least along a longitudinal segment of the optical fiber.

20. The kit according to claim 3, wherein the optical fiber is a lossy fiber emitting light coming from the or each light emitting diode along the entire length of the optical fiber.

\* \* \* \* \*